(12) United States Patent
Christensen

(10) Patent No.: US 8,388,266 B2
(45) Date of Patent: Mar. 5, 2013

(54) APPARATUS FOR AND METHODS OF STABILIZING A LEAKING DAM OR LEVEE

(76) Inventor: Arthur E. Christensen, Towson, MD (US)

(*) Notice: Subject to any disclaimer, the term of this patent is extended or adjusted under 35 U.S.C. 154(b) by 0 days.

(21) Appl. No.: 13/066,644

(22) Filed: Apr. 20, 2011

(65) Prior Publication Data

US 2012/0269577 A1    Oct. 25, 2012

(51) Int. Cl.
    *E02B 7/00*    (2006.01)
(52) U.S. Cl. ......................... 405/107; 405/270
(58) Field of Classification Search ............ 405/107, 405/115, 116, 117, 268, 270, 15, 16, 17
See application file for complete search history.

(56) References Cited

U.S. PATENT DOCUMENTS

| 1,039,579 | A | | 9/1912 | Neames | |
|---|---|---|---|---|---|
| 3,415,062 | A | * | 12/1968 | Ziegenmeyer | 405/117 |
| 4,184,786 | A | | 1/1980 | Richards | |
| 5,951,202 | A | * | 9/1999 | Brown | 405/19 |
| 6,612,779 | B1 | * | 9/2003 | Scuero | 405/107 |
| 7,431,533 | B1 | * | 10/2008 | Oda | 405/107 |

FOREIGN PATENT DOCUMENTS

DE    29703385    * 9/1997

* cited by examiner

*Primary Examiner* — Frederick L Lagman
(74) *Attorney, Agent, or Firm* — J. Bruce Hoofnagle

(57) ABSTRACT

An apparatus 40 is used for stabilizing a leak in a dam 20, which was built adjacent a body of water 26 to prevent flooding of the water onto adjacent land areas 24a. Leaks in the dam 20 may occur because of a breach 38 developing undesirably in, and possibly through, the dam. The apparatus 40 includes an elastomeric sheet 44, which is wound onto a spool 48, when the apparatus is in a storage-and-handling mode. When the breach 38 is discovered, the apparatus 40 is placed adjacent the dam 20 and the sheet 44 is unfurled into a breach-sealing mode of the apparatus, where the breach 38 is covered and sealed by the unfurled sheet.

21 Claims, 4 Drawing Sheets

APPARATUS FOR AND METHODS OF STABILIZING A LEAKING DAM OR LEVEE

BACKGROUND OF THE INVENTION

This invention relates to apparatus for and methods of stabilizing a leaking dam or levee, and particularly relates to apparatus for and methods of stopping leaks through dams such as, for example, earth dams, typically located along the banks of quiescent bodies of water, and levees along waterways, which contain moving water.

A quiescent body of water typically includes lakes, reservoirs, and the like, which are contained within a completely enclosing shoreline, where, normally the water does not escape or flow from within the quiescent body. Waterways of moving water include canals, rivers, and the like, where the water is typically continuously flowing along the banks thereof, which confines the flowing water between the banks, where the flowing water eventually empties into a larger body of water such as, for example, a sea or an ocean.

As long as there are no incidents which cause the level of the water to rise in the quiescent bodies and waterways, the water remains within the defined boundaries of the shoreline and banks, respectively. However, weather-related incidents, such as, for example, wind storms and rain, can result in excess amounts of water along at least sections of the quiescent bodies and the waterways, where the water level thereof extends beyond the shoreline and the banks, respectively, resulting in devastating flooding of areas adjacent the bodies and waterways. Such flooding is widely known for causing loss of life and property damage.

Naturally formed dams and levees are typically formed as a consequence of flooding over the shoreline and banks, where sediment is deposited, and results in protective barriers which are higher than the floodplain for that area. Man-made dams and levees are constructed purposely to be higher than the floodplains, and may be constructed with concrete, rocks, soil, and the like. Dams and levees formed by compacted soil, and the like, are typically referred to as earth dams and levees, and are susceptible to breaches in the soil, which weaken and erode the protective features of the earth dams and levees. While the major constituent of earth dams is compacted soil, such dams may also include a limited amount of rocks, pebbles, and the like.

For purposes of brevity, and not by way of limitation, a dam and a levee will be referred to hereinafter as "a dam."

In the past, as a technique for minimizing, or even preventing, the disasterous flooding events noted above, dams have been built around the quiescent bodies of water, and along the banks of the waterways, to increase the level to which the water is allowed to rise before becoming a flooding threat to nearby people and property. While man-made dams composed of concrete and the like are generally considered as breach-free structures, breaches do occur in such dams, thereby lessening the integrity of the dam. However, as noted above, man-made and natural dams, composed primarily of compacted soil, are particularly susceptible, under the hydrostatic pressure of the contained body of water, to erosion. Such erosion causes leaks through the dams, which could cause the dams to collapse in the vicinity of the erosion. Therefore, earth dams require constant surveillance, and repair, to maintain the integrity of such dams.

Consequently, there is a need for an apparatus for, and methods of, facilitating the stopping of the undesirable leakage of water within, and through, a breach in the structure of a dam to maintain and stabilize the integrity of the dam for continued use.

Further, there is a need for an apparatus for, and methods of, facilitating temporary stopping of the undesirable leakage of water within, and through, a breach in the structure of a dam to preclude the flow of water through the breach, and to maintain and stabilize the integrity of the dam, during a period when the breach-containing portion of the dam is being repaired.

An article, written by Mike Field, titled, "Fragile Foundations," which appeared in "Johns Hopkins Engineering, The Magazine of the Johns Hopkins Whiting School of Engineering," Winter 2010, starting on page 12, refers to the biennial report card of the American Society of Civil Engineers on the state of America's infrastructure in 2009, including dams and levees. As noted in the article, "Thousands of the nation's dams, for instance, are rated structurally deficient, and no fewer than 1800 of those are rated "high hazard" dams, meaning their catastrophic failure would result in significant loss of life."

In today's economic climate, it is highly unlikely that such a large infrastructure investment will be made.

Consequently, there is a need for a relatively low cost apparatus for and methods of facilitating the stabilization and maintenance of the nation's dams, particularly during a period when it appears that high-cost repairs and reconstruction to such "high hazard" dams may not be forthcoming.

As shown and described in U.S. Pat. No. 4,184,786 (the '786 patent), which issued on Jan. 22, 1980, a water-impervious, flexible cover is placed over surfaces of an earth dam to protect vulnerable surfaces of the dam from developing breaches. The cover extends over at least the top surface and the downstream surface of the dam, and preferably extends over the upstream surface of the dam as well. Also, the cover extends to, and is anchored at the bed of the body of the water on the downstream side of the dam, and to the ground on the upstream side of the dam. Such an extensive cover for an entire dam would be very costly in order to protect the entire dam in the manner described in the '786 patent.

Thus, there is a need for cost-effective apparatus of and methods for stabilizing an earth dam in the event of a leak through a breach in the dam.

Also, the type of material of the cover, as described in the '786 patent, is an organic material which may become brittle and crack under prolonged exposure to the environment, including debilitating stresses to which a cover for an earth dam is typically subjected. In particular, organic materials soften and deform irreversibly at temperatures greater than 100° C., and become brittle at temperatures less than −25° C.

Thus, there is a need for an apparatus of and methods for stabilizing an earth dam wherein the material of critical portions of the apparatus are capable of maintaining structural resiliency and integrity when subjected to here-to-fore potentially debilitating stresses.

SUMMARY OF THE INVENTION

It is, therefore, an object of this invention to provide an apparatus for, and methods of, facilitating the stopping of the undesirable leakage of water within, and through, a breach in the structure of a dam to maintain and stabilize the integrity of the dam for continued use.

Another object of this invention is to provide an apparatus for, and methods of, facilitating temporary stopping of the undesirable leakage of water within, and through, a breach in the structure of a dam to preclude the flow of water through the breach, and to maintain and stabilize the integrity of the dam, during a period when the breach-containing portion of the dam is being repaired.

A further object of this invention is to provide a relatively low cost apparatus for and methods of facilitating the stabilization and maintenance of the nation's dams, particularly during a period when high-cost repairs and reconstruction to such dams may not be available.

Another object of this invention is to provide a cost-effective apparatus of and methods for stabilizing an earth dam in the event of a leak through a breach in the dam.

A still further object of this invention is to provide an apparatus of and methods for stabilizing an earth dam wherein the material of critical portions of the apparatus are capable of maintaining structural resiliency and integrity when subjected to heretofore potentially debilitating stresses.

With these and other objects in mind, this invention contemplates an apparatus for stabilizing a leak in a dam or a levee, which includes a flexible sheet composed of a material capable of withstanding hydrostatic water pressure in a body of water without rupturing. The flexible sheet is manipulatable for positioning breach-sealable portions of the sheet over a breach in the dam or the levee into which the leak could flow. The flexible sheet is composed of an inorganic material which maintains consistent flexibility and resilience when subjected to temperatures within a range from −100° C. to 316° C.

This invention also contemplates a portable and reusable apparatus for covering and stabilizing an existing breach located in an unprotected portion of a dam or a levee to preclude a leak of water, into the breach, from a body of water adjacent the dam or the levee. The apparatus includes a flexible sheet composed of a material which is impervious to water, and has a proximal portion and a distal portion spaced from the proximal portion thereof. Means are attached to the proximal portion of the flexible sheet for facilitating handling of the flexible sheet. A portion of the flexible sheet is sufficiently supple to allow the portion of the flexible sheet, when placed over the breach in the dam or levee, to be urged into, and seal, the breach to preclude a leak of the water into the breach.

This invention further contemplates a portable and reusable apparatus for covering and stabilizing an existing breach located in an unprotected portion of a dam or a levee to preclude a leak of water, into the breach, from a body of water adjacent the dam or the levee, and includes a flexible sheet having a proximal end and a distal end. The flexible sheet further includes an intermediate section which extends between the proximal end and the distal end spaced from the proximal end thereof. The flexible sheet is composed of a material which is impervious to water, and which is sufficiently supple to cover and seal the breach from the body of water. A rotatable spool is coupled to the proximal end of the flexible sheet for rotation relative to the flexible sheet. The apparatus also includes at least one cord which has a proximal end, a distal end and an intermediate section.

The proximal end of the cord is attached to the rotatable spool, the distal end of the cord is attached to the proximal end of the flexible sheet, and the intermediate section of the cord extends from the proximal end thereof over an outboard major surface of the flexible sheet, about the distal end of the flexible sheet, and over an inboard major surface of the flexible sheet, and to the distal end of the cord. The spool is rotatable relative to the flexible sheet to facilitate selective movement of the cord in opposite directions during movement of the flexible sheet between a storage-and-handling mode and a breach-sealing mode, and vice-versa.

This invention still further contemplates a method of covering and stabilizing an existing breach located in an unprotected portion of a dam or a levee to preclude a leak of water, into the breach, from a body of water adjacent the dam or the levee. The steps of the method include (1) providing a water-impervious flexible sheet having a proximal end, a distal end and an intermediate section extending between the proximal end and the distal end spaced from the proximal end thereof, (2) storing the flexible sheet in the form of a full package when the flexible sheet is in a storage-and-handling mode, (3) unfurling a proximal portion the flexible sheet extending from the proximal end of the flexible sheet from the the package while retaining the remainder of the flexible sheet in a less-than-full package, (4) placing the less-than-full package of the remainder of the flexible sheet into the body of water, and (5) unfurling at least a portion of the water-bound less-than-full package of the flexible sheet sufficient for a breach-sealing portion of the flexible sheet to cover the breach, whereby the flexible sheet is in a breach-sealing mode.

DESCRIPTION OF THE PREFERRED EMBODIMENTS

Figure 1:
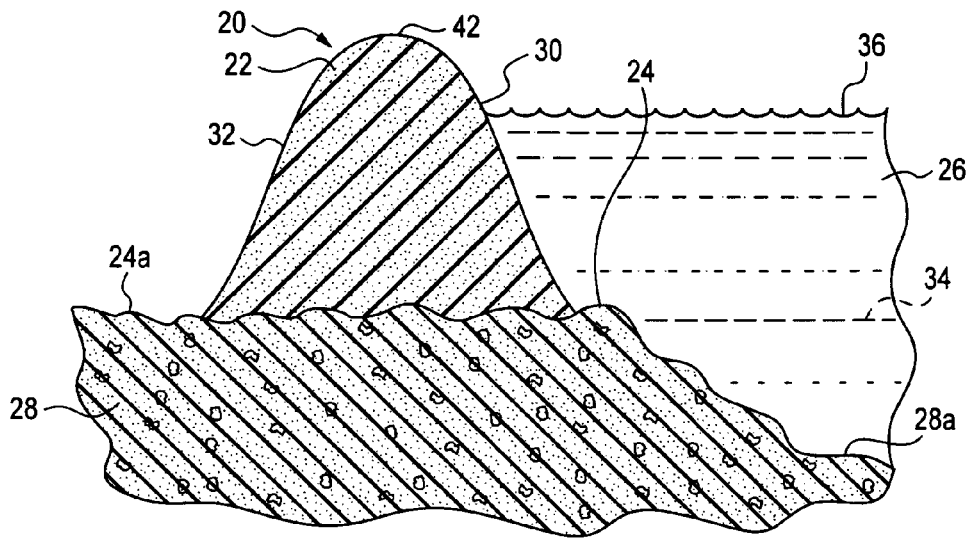
FIG. 1 is a sectional view showing the cross sectional shape of compacted soil which forms an earth dam along a bank of a body of water.

Referring to FIG. 1, an earth dam 20 is formed with a mound-like cross section, and is composed of compacted soil 22, which could include limited amounts of rock and pebble. The earth dam 20 is located along the shoreline or bank 24 of a body of water, hereinafter referred to as the water 26. The bank 24 is formed by an upper level of a land mass 28, with a depression in the land mass forming a bed 28a for the water 26. The water 26 may be quiescent, such as, for example, in a lake, or moving, such as, for example, in a canal. The earth dam 20 is formed with a water-covered side 30, which is in engagement with the water 26, and an uncovered side 32, which is on a side of the dam opposite from the water-covered side. The earth dam 20 must be of sufficient integrity to withstand the hydrostatic pressure exerted thereon by the water 26.

Normally, the upper level of the water 26 will be below the bank 24, as illustrated by the dashed line 34 in FIG. 1. Under this circumstance, the water 26 is contained, and will not flow over areas higher than the bank 24. However, extreme weather conditions such as, for example, wind and rain, could cause the water 26 to rise to a level higher than the bank 24, which level is well above the level of the bank. In this situation, the water 26 will flow over the bank 24, and onto land areas 24a, resulting in undesirable flooding of such land areas, and the possibility of property damage and loss of life.

The dam 20 is located on the bank 24, and has a peak, or top, 42 built to a height sufficient to allow the water 26 to rise to levels higher than the bank, and to a higher limit defined by the height of the peak, above which the water would overflow the dam and flood the land areas 24a. One such higher level is illustrated as a level 36, which precludes the water from flowing onto, and preventing the flooding of, the land areas 24a.

Figure 2:
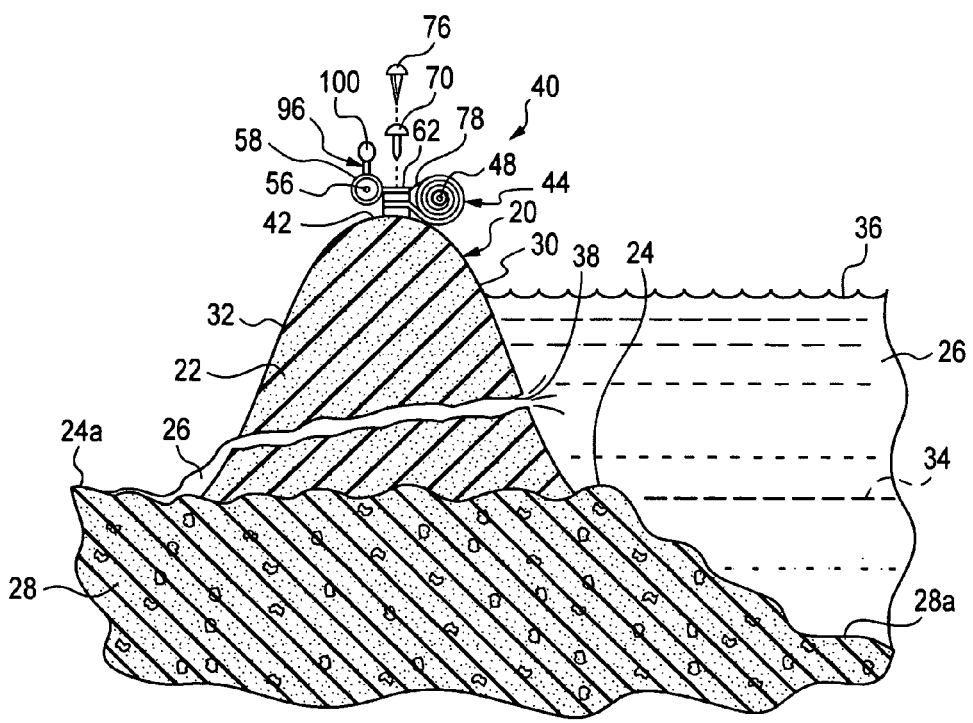
FIG. 2 is a sectional view showing a breach formed in a water-covered side of the earth dam of FIG. 1, allowing a leak to form through the dam, whereby water, from the body of water normally confined by the dam, to leak into, and through, the breach, under the hydrostatic pressure of the body of water, to an uncovered side of the dam opposite the water-covered side thereof, and an end view showing an apparatus for stabilizing the leak, with the apparatus shown in a pre-stabilization, storage-and-handling mode in preparation for placing the apparatus in a stabilizing, breach-sealing mode, in accordance with certain principles of the invention.

Referring to FIG. 2, frequently, at least along some portions of the water-covered side 30, the integrity of the earth dam 20 cannot withstand the hydrostatic pressure of the water 26, and a breach 38 or fissure is formed in the water-covered side. The water 26 entering the breach 38 erodes the surrounding walls of the breach, and extends the length of the breach toward the uncovered side 32 of the dam 20. Eventually, the breach 38 is formed completely through the earth dam 20, as illustrated in FIG. 2, whereafter the water 26 flows from the breach, down the uncovered side 32, and onto the land area 24a. A continuation of the flow of the water 26 through the breach 38, and onto the land area 24a, could result in serious damage to the earth dam 20, eventually leading to the collapse of the dam in the vicinity of the breach, and flooding of the land area well beyond the uncovered side 32 of the dam. As noted above, this could lead to loss of life and property damage.

As a consequence of one or more breaches, such as the breach 38, in the structure of the earth dam 20, constant inspections should be conducted to note such breach failures, and to allow adequate time (1) to stem the deleterious effects of the breach, and (2) to repair the resulting damage, prior to the occurrence of damaging floods in surrounding neighborhoods.

As shown in FIG. 2, an apparatus 40 for stabilizing a leak, such as the breach 38 in the dam 20, is shown in a pre-stabilization, storage-and-handling mode, and is resting on the peak 42 of the dam 20 in preparation for initiating a process to place the apparatus into a stabilizing, breach-sealing mode.

Figure 4:
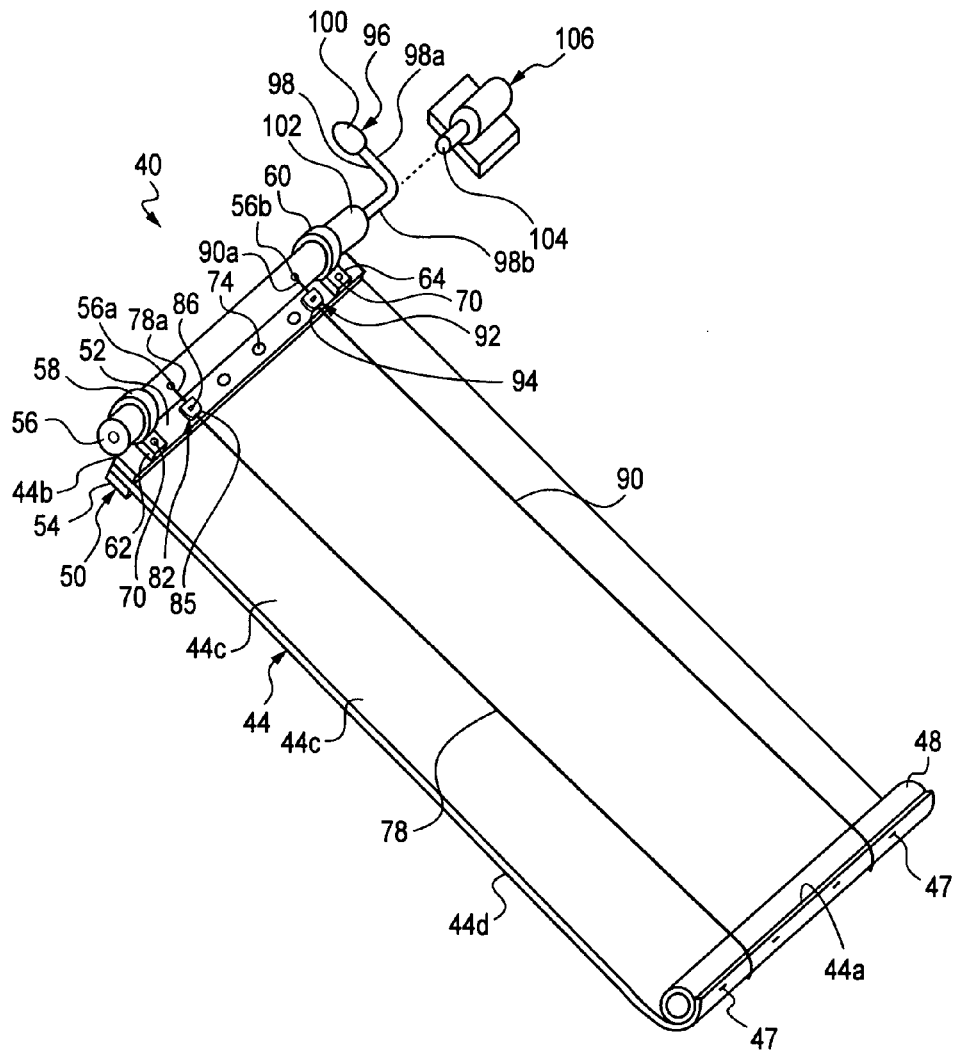
FIG. 4 is a perspective view showing the apparatus of FIGS. 2 and 3 with a flexible sheet of the apparatus being unfurled, open and flattened representing the apparatus in the stabilizing, breach-sealing mode, as shown in FIG. 3, to seal the breach in the water-covered side of the dam, in accordance with certain principles of the invention.

As shown in FIG. 4, the apparatus 40, for stemming the deleterious effects of the above-noted breach 38 (FIG. 2), includes a flexible sheet 44 formed from a flexible material, which is impervious to water, and is of sufficient strength to preclude rupture thereof when the material is subjected to the hydrostatic pressure of the water 26 (FIG. 2), including being sufficiently supple at the location of the breach-sealing portion thereof to be urged into, and seal, the breach without rupture.

In addition, the material of the flexible sheet 44 has sufficient density and weight to allow it to sink, on its own, without additional assistance, when placed in the body of the water 26, and is sufficiently flexible to be manipulatable for positioning breach-sealing portions thereof over the breach in the dam into which the leak could otherwise flow. Further, the material of the flexible sheet 44 is an elastomer, such as, for example, silicone rubber, which has suitable weight and durometer to function in the manner noted herein.

The flexible sheet 44 may be composed of materials other than an elastomer, provided that all of the specifications are met, without departing from the spirit and scope of the invention. Also, the material of the flexible sheet 44 is an inorganic material which maintains consistent flexibility and resilience when subjected to temperatures within a range between −100° C. to 316° C.

A material which has the above-noted properties for the flexible sheet 44, of this invention, is silicone rubber, which is a synthetic elastomer available from Dow Corning Corporation, having an address at 3901 S. Saginaw Road, Midland, Mich. 48640, under the SILASTIC® and XIAMETER® brands, which are trademarks owned by Dow Corning Corporation.

While the flexible sheet 44 can assume any flattened shape desired during the period when the apparatus 40 is in the breach-sealing mode to stem the deleterious effects of the breach 38 (FIG. 2), it will be assumed, for purposes of description, that the sheet is in the shape of a rectangle when opened or flattened, as shown in FIG. 4. Other shapes of the sheet 44, when flattened or otherwise, can be used without departing from the spirit and scope of the invention.

As shown in FIG. 2, the sheet 44 of the apparatus 40 is of sufficient flexibility to allow the sheet to be manipulated into a storage package in a configuration of a sheet-storage roll 46, when the apparatus is in the storage-and-handling mode, to facilitate easy storage, portability, and handling of the apparatus during periods when the apparatus is not being used to stem the deleterious effects of the breach 38. The storage package can assume other configurations, other than the sheet-storage roll 46, without departing from the spirit and scope of the invention.

Many earth dams in the world are less than fifty feet in height, but earth dams having a height of several hundred feet do exist. Consequently, the apparatus 40 can be made with the flexible sheet 44 being of a sufficient length to accommodate the stabilization of a leak in dams of heights of several hundred feet and higher.

It is noted that the thickness "T" of the flexible sheet 44 (FIG. 5) is in a range between 0.015 inch and 0.030 inch, with the thickness of the sheet being 0.020 inch in the preferred embodiment of the invention.

As further shown in FIG. 4, the apparatus 40 is in the breach-sealing mode, with the flexible sheet 44 being in an open, unfurled, flat arrangement, and having a distal end 44a, a proximal end 44b, and an intermediate section extending between the distal and proximal ends. The distal end 44a of the sheet 44 is attached, by fasteners 47, to a support spool 48 composed of a material which is impervious to water. The spool 48 is a weight, which will sink in water on its own. The spool 48 provides a support upon which the flexible sheet 44 can be wrapped, or wound about, to form the sheet-storage roll 46 (FIG. 2), and also functions as the weight which assists in the sinking of the flexible sheet into the water 26.

Figure 5:
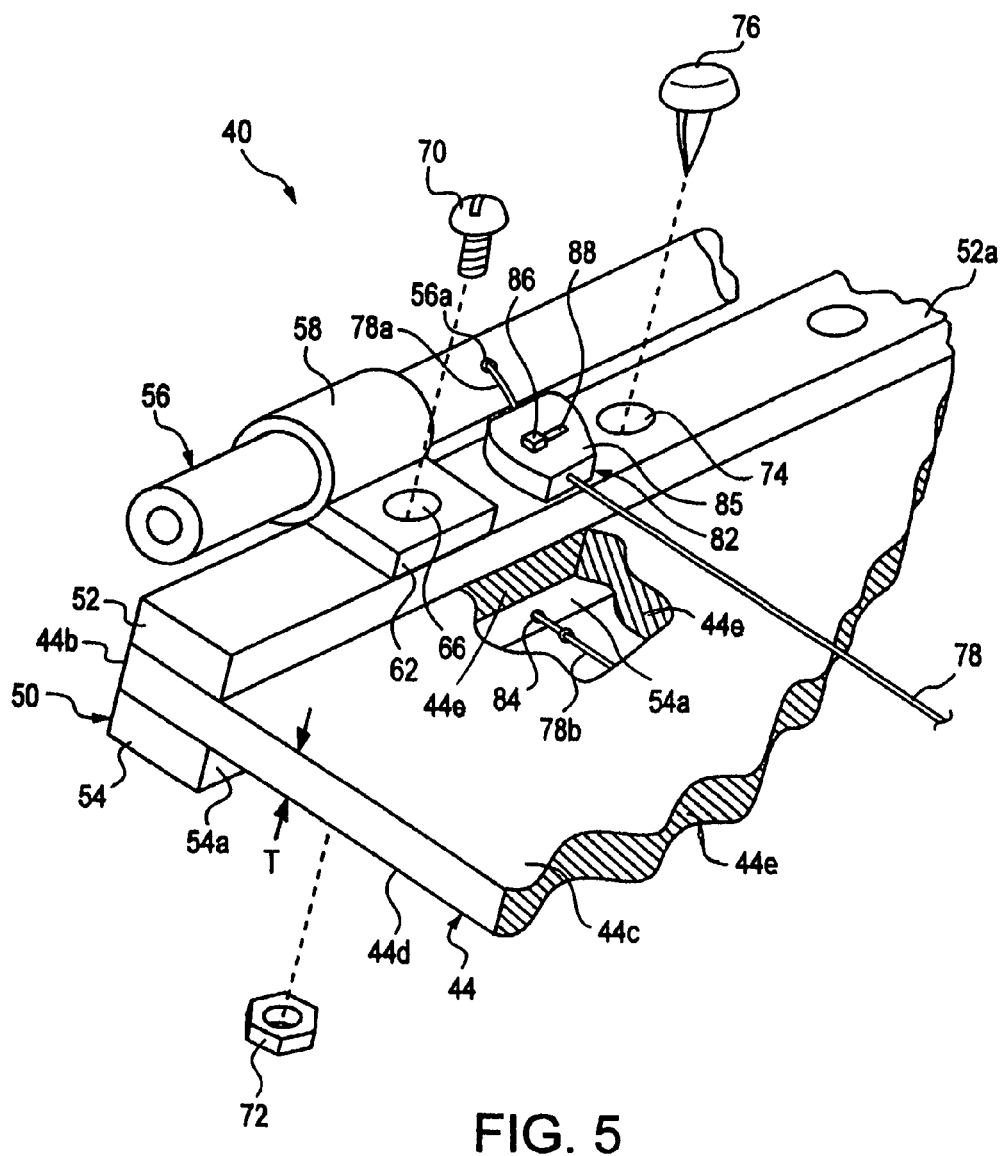
FIG. 5 is a partial perspective view showing elements of the apparatus of FIGS. 2, 3 and 4, which are operational to facilitate (1) the packaging of the flexible sheet to place the apparatus in the storage-and-handling mode, as shown in FIGS. 2, and (2) the unfurling of the flexible sheet to place the apparatus in the breach-sealing mode, as shown in FIGS. 3 and 4, in accordance with certain principles of the invention.

Referring to FIGS. 4 and 5, the proximal end 44b of the flexible sheet 44, which is parallel with and spaced from the distal end 44a, is secured to a stiffening support assembly 50, which includes a first support bar 52 having the proximal end of the flexible sheet attached thereto. The stiffening support assembly 50 may also include a second support bar 54, which is placed in overlaying fashion with the first support bar 52, with the proximal end 44b of the sheet 44 being sandwiched between, and secured to, the stiffening support assembly formed by the first and second support bars.

The first support bar 52 and the second support bar 54 function individually, or collectively, as a means attached to the proximal end 44b of the flexible sheet 44 for facilitating handling of the flexible sheet.

As shown in FIG. 5, internal structure 44e of the flexible sheet 44 is shown with solid cross-hatching at three different locations, to illustrate that the internal structure is solid, unwoven, self-supporting, and is free internally of any physical support structure independent of the silicone rubber of the flexible sheet.

A rotatable spool 56 is located adjacent, and parallel with, the stiffening support assembly 50, and is mounted for rotation within, and relative to, a pair of spaced bearings 58 and 60 (FIG. 4). The bearing 58 is formed integrally with a flange pad 62, which extends radially outward from an outer surface of the bearing. In like fashion, as shown in FIG. 4, the bearing 60 is formed integrally with a flange pad 64, which extends radially outward from an outer surface of the bearing. Each of the pads 62 and 64 is formed with a through hole, such as, for example, the through hole 66 (FIG. 5). The pads 62 and 64 are mounted at spaced locations on an outboard surface 52a of the first support bar 52, with the through holes 66 thereof being aligned with aligned holes (not shown) formed through the first support bar, the sheet 44, and the second support bar 54. A pair of threaded bolts, one shown as a bolt 70 in FIG. 5, are positioned through the aligned holes of the respective pads 62 and 64, the first support bar 52, the sheet 44, and the second support bar 54, and are threadedly assembled with a respective pair of nuts, one shown as a nut 72 in FIG. 5, to secure the bearings 58 and 60 with the stiffening support assembly 50 and the sheet 44. Other types of fasteners may be used in place of the bolt 70 and nut 72 without departing from the spirit and scope of the invention.

The first support bar 52 is formed with a plurality of holes 74, which align with corresponding holes (not shown) of the sheet 44 and the second support bar 54, to receive securing spikes 76 (FIG. 5), or similar fasteners. The spikes 76 are driven into a fixed structure, such as, for example, the soil 22 at the peak 42 of the dam 30 to secure the apparatus 40 in the storage-and-handling mode illustrated in FIG. 2, in preparation for eventually placing the sheet 44 in the breach-sealing mode. The apparatus 40 could be secured to other nearby fixed structures, or to other surface portions of the dam 20, exclusive of the water-covered side 30 of the dam which is in engagement with the water 26, without departing from the spirit and scope of the invention.

Referring further to FIGS. 4 and 5, the apparatus 40 includes a first roll-up retaining cord 78, which is in a looping arrangement about, but not secured to, the flexible sheet 44, as best viewed in FIG. 4, with the flexible sheet completely unfurled. A first end 78a of the cord 78 is secured to a location 56a on the outer surface of the rotatable spool 56, adjacent the bearing 58. The cord 78 is then extended through a latching device 82, mounted on the outboard surface 52a of the first support bar 52, over a major outboard, or water-side, surface 44c of the sheet 44, around the distal end 44a of the flexible sheet, which is attached to the spool 48. The cord 78 is then extended along a major inboard, or dam-side, surface 44d of the sheet 44, which is on the side of the sheet opposite the major outboard surface 44c. A second end 78b of the cord 78 is attached, for example, to an eyelet 85, which is attached to a side face 54a of the second support bar 54, as shown in FIG. 5.

As shown in FIG. 5, the latching device 82 includes a housing 84, within which is a smooth-faced roller (not shown), over which the first retaining cord 78 will move when the sheet 44 is being unfurled to the breach-sealing mode, or wound onto the spool 48 to form the sheet-storage roll 46 (FIG. 2) in the storage-and-handling mode. The smooth-faced roller is attached to a slide bar 86, located on an exterior surface of the housing 84, with portions (not shown) extending through a slot 88 formed in the housing, and attached to the smooth-faced roller within the housing. When the apparatus 40 is in the storage-and-handling mode, the slide bar 86 is moved in a first direction, relative to the slot 88, to sandwich the cord 78 between the roller and an interior wall (not shown) of the housing 84, and the slide bar is latched in this position by a mechanism (not shown). In this manner, the cord 78 is prevented from unreeling from the spool 56, and the apparatus 40 is retained in the storage-and-handling mode. A hand force can be applied to the slide bar 86 in a second direction, which is a direction opposite the first direction, to overcome the latching of the slide bar 86, and to allow the sheet 44 to unfurl.

Referring to FIG. 4, the apparatus 40 also includes a second roll-up retaining cord 90 which is secured at a first end 90a thereof to a location 56b on the outer surface of the rotatable spool 56, adjacent the bearing 58. The cord 90 is then extended through a latching device 92, mounted on the outboard surface 52a of the first support bar 52, over the unfurled surface 44c of the sheet 44, around the extended remainder portion of the sheet wound on the spool 48, and any exposed portions of the spool. The cord 90 is then extended along the underside surface 44d of the sheet 44, with a second end (not shown) of the cord being attached, for example, to an eyelet (not shown), which is attached to the side face 54a (FIG. 5) of the second support bar 54.

In a manner identical to the latching device 82 (FIG. 5), the latching device 92 includes a housing, within which is a smooth-faced roller (not shown), over which the second roll-up retaining cord 90 will move when the sheet 44 is being unfurled into the breach-sealing mode, or wound onto the spool 48 to form the sheet-storage roll 46 (FIG. 2) in the storage-and-handling mode. The smooth-faced roller is attached to a slide bar (not shown), located on an exterior surface of the housing, with portions (not shown) extending through a slot (not shown) formed in the housing, and attached to the smooth-faced roller within the housing. When the apparatus 40 is in the storage-and-handling mode, the slide bar of the latching device 92 is moved in a first direction, relative to the slot formed in the housing 94 to sandwich the cord 90 between the roller and an interior wall (not shown) of the housing, and the slide bar is latched in this position by a mechanism (not shown). In this manner, the cord 90 is prevented from unreeling from the spool 56, and the apparatus 40 is retained in the storage-and-handling mode. A hand force can be applied to the slide bar of the latching device 92 in a second direction, which is a direction opposite the first direction, to overcome the latching of the slide bar, and to allow the sheet 44 to unfurl.

It is noted that the structure, the assembly arrangement, and the interrelated functioning of the bearing 60 and the flange pad 64, the roll-up retaining cord 90, the latching device 92, and the elements associated therewith, shown in FIG. 4, are a mirror image of the structure, the assembly arrangement, and the interrelated functioning of the bearing 58 and the flange pad 62, the roll-up retaining cord 78, the latching device 82, and the elements associated therewith, respectively, shown in FIG. 5, and described herein above.

It is further noted that means for maneuvering the flexible sheet 44 from a breach-sealing mode into a storage package in a storage-and-handling mode includes the cord 78, the rotatable spool 56, the attachment of the proximal end 78a of the cord to the rotatable spool, the distal end 78b of the cord attached to the second support bar 54 (or the first support bar 52), the looping arrangement of the cord about the flexible sheet as described above, and about the distal end 44a of the flexible sheet, and to the distal end of the cord.

Referring to FIG. 4, a crank 96 is formed with an "L" shaped arm 98, having a first leg 98a joined integrally with a second leg 98b. A knob 100 is attached to a free end of the first leg 98a, and a free end of the second leg 98b is selectively attachable to, and in axial alignment with, an end 102 of the spool 56. When it is desired to transform the apparatus 40 from the breach-sealing mode, as shown in FIG. 4, to the storage-and-handling mode, as shown in FIG. 2, the free end of the second leg 98b of the crank 96 is attached, axially, to the end 102 of the spool 56. The crank 96 is then rotated, in a prescribed direction, about the axis of the spool 56 to rotate the spool and wind the cords 78 and 90 onto the spool. By virtue of the cords 78 and 90 being wound onto the spool 56, the spool 48 is moved linearly toward the spool 56, and is also rotated to facilitate the winding of the sheet 44 about, and onto, the spool 48. Eventually, the sheet 44 is fully wound onto the spool 48, which has now been moved to the storage-and-handling mode of the apparatus 40, as illustrated in FIG. 2.

As an alternative to the crank 96, a drive shaft 104 of a small electrical motor 106 may be attached axially to the end 56b of the spool 56, in place of the crank 96, and the motor controlled to accomplish the transformation of the apparatus 40 from the breach-sealing mode to the storage-and-handling mode in the manner described above with respect to use of the crank.

Without departing from the spirit and scope of the invention, (1) the motor 106 could be battery-operated, or powered from an independent power source, (2) the motor could be a reversible motor, and (3) the crank 96 could be rotatable about the axis of the spool 56 in a clockwise direction and a counter-clockwise direction. Both the crank 96 and the motor 106, when attached to the spool 56, are considered to be a part of the apparatus 40.

A cord moving mechanism includes the rotatable spool 56, mounted for rotating movement at least within the bearing 58, which, through the support bar 52, is attached to the proximal end 44b of the flexible sheet 44. The cord moving mechanism may also include the mounting of the rotatable spool 56 within the bearing 60 in similar fashion. Each of (1) means for operating the cord moving mechanism to move the cord 78 in a direction to maneuver the flexible sheet 44 from the breach-sealing mode to the storage-and-handling mode, and (2) means for operating the cord moving mechanism to move the cord 78 in a direction to maneuver the flexible sheet 44 from the storage-and-handling mode to the breach-sealing mode, and (3) means for moving the spool 56 to move the cord 78, include the crank 96 or the motor 106.

The unfurling of the sheet 44 from the storage-and-handling mode to the breach-sealing mode may be accomplished without the use of the crank 96 or the motor 106 by allowing the spool 48 and the sheet wound thereon to roll, by gravity or manual assistance, down a sloped surface such as, for example, the water-covered side 30 of the dam 20. However, the crank 96 or the motor 106 could be used to control the unfurling of the sheet 44 if desired, or necessary, without departing from the spirit and scope of the invention.

Referring again to FIG. 2, a repairman, or inspector, may discover the breach 38 by virtue of the water 26 exiting from the breach on the uncovered side 32 of the dam 20. It is possible that, if the breach 38 does not extend to the uncovered side 32 of the dam 20, the repairman could also initially discover the breach 38 by inspecting the water-side 30 of the dam 20. Regardless of the manner of discovering the breach 38, the breach should be stabilized on the water-covered side 30 of the dam 20, to stem the leak. If desired, the dam 20 can then be repaired in the area of the breach 38, without concern for the water 26 entering, and flowing through, the breach, during the repair operation.

Referring to FIG. 2, after observing the breach 38, the repairman transports the apparatus 40, while in the storage-and-handling mode, to a position for eventually covering the breach when the sheet 44 is unrolled, or unfurled, into the water 26. The apparatus 40 is placed on, or near, an upper portion of the earth dam 20, with the support assembly 50 resting on the dam. The support assembly 50 is then secured to the dam 20 by use of the above-noted spikes 76. The rolled sheet 44 is then maneuvered to the upper edge of the water-covered side 30 of the dam 20, and is released, or unfurled, to roll, by gravity, down the water-covered side. The ability of the flexible sheet 44 to sink in water, and the weight of the spool 42, facilitates the unrolling movement of the sheet 44 down the water-covered side 30 of the dam 20, and the sinking of the spool with the sheet, into the water 26, until such unrolling, or unfurling, movement is complete. It is noted that, as described above, the sheet 44 is of sufficient weight to facilitate the sinking of the sheet into the water 26, independently of the weight of the spool 48.

In the above-described process, the flexible sheet 44 is initially stored in the form of a full package, such as the sheet-storage roll 46. After the apparatus 40 has been placed on, and secured to, the top 42 of the dam 20, the unfurling of the sheet 44 is initiated, where a proximal portion of the sheet is initially unfurled from the proximal end 44b of the full package. Thus, a portion of the full package of the flexible sheet 44 has been unpackaged, or unfurled, but a remainder of the flexible sheet remains in a package form, which is less than the full package, and is referred to a less-than-full package. The less-than-full package of the flexible sheet 44 is then placed into the water 26 as a water-bound less-than-full package, and the sheet continues to be unfurled within the water from the less-than-full package.

If the breach 38 is located at a portion of the water-covered side 30 of the dam 20, at a distance from the top 42 of the dam which is less than the total length of the flexible sheet 44, only a portion of the water-bound less-than-full package of the sheet need be unfurled in order to place the sheet in a breach-sealing mode, with a breach-sealing portion covering the breach. This limited, or less-than-full, amount of unfurling of the flexible sheet 44 can be controlled by limiting the number of rotations of the rotatable spool 56 during the unfurling operation, which can be accomplished by hand, by use of the crank 96, or by use of the reversible motor 106.

During the unrolling, or unfurling, movement, the sheet 44 is located against the adjacent portion of the water-covered side 30 of the dam 20, with a portion of the sheet being located over the breach 38 formed in the water-covered side of the dam. The above-noted physical properties of the elastomeric sheet 44 are such that the hydrostatic pressure of the water 26 urges the sheet into conforming engagement with the adjacent portion of the water-covered side 30 of the dam 20.

Figure 3:
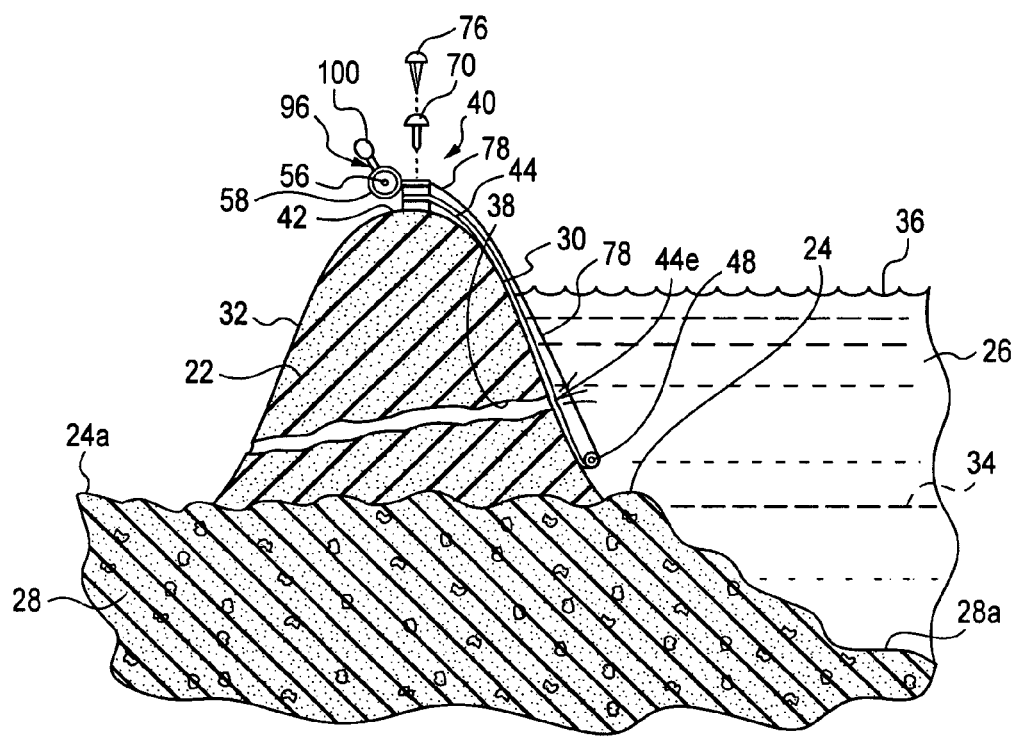
FIG. 3 is a sectional view showing the apparatus of FIG. 2 placed in a stabilizing, breach-sealing mode for covering and sealing the breach on the water-covered side of the dam, in accordance with certain principles of the invention.

With a portion 44e of the now-flattened sheet 44 is located over the breach 38 on the water-covered side 30 of the dam 20, as shown in FIG. 3, the hydrostatic pressure of the water 26 will urge and deform the located portion 44e of the sheet into sealing arrangement with the breach, and preclude the flow of the water into the breach. Consequently, the leak in the dam 20 is stabilized, and concern for further erosion is mitigated. Repairmen can then reconstruct, and/or repair, the breached portion of the earth dam 20. The earth dam 20 is again in condition to preclude the flow of the water 26 through the dam, whereby devastating flooding is avoided.

The apparatus 40 can then be removed from the water 26 by a use of the crank 96, or the motor 106, in the manner described above. As the sheet 44 is removed from the water 26, the sheet is manipulated into the form of a storage package, which, in the preferred embodiment of the invention, is the rolled position about the spool 48, as shown in FIG. 2. The apparatus 40, now in the storage-and-handling mode, can then be stored at a suitable location for use to repair other breaches of the earth dam 20. Due to the versatility and easy handling of the apparatus 40, the apparatus need not be stored at each earth dam 20, but could be stored at a strategic location for quick availability. Further, there is no limitation to the length and width of the sheet 44, which can be based on the needs of the repairmen, and the height of the dam 20.

The above-noted physical properties of the elastomeric material, which forms the sheet 44, and which facilitates the stabilizing of the leaking dam 20, include (1) a suitable durometer and elasticity so that the sheet conforms to contours and irregularities of the water-covered side 30 of the dam, (2) suitable low-temperature flexibility to allow for the use of the material at freezing temperatures, (3) suitable structural strength to maintain integrity while adhering to the water-covered side 30 of the dam and to allow for intact removal, (4) suitable structural strength such that supporting structures along the sides of the sheet, other than at the top and bottom thereof, are not required during the use of the apparatus 40, which facilitates the capability of rolling and unrolling of the sheet, and (5) suitable density to facilitate the sinking of the sheet and the continued submergence thereof during the stabilizing use of the apparatus.

In general, the above-identified embodiments and procedures are not to be construed as limiting the breadth of the present invention. Modifications, and other alternative constructions and procedures, will be apparent which are within the spirit and scope of the invention.

What is claimed is:

1. Apparatus for stabilizing a leak in a dam or a levee, which comprises:
    a flexible sheet composed of solid, unwoven silicone rubber capable of withstanding hydrostatic water pressure in a body of water without rupturing;
    the flexible sheet being manipulatable for positioning breach-sealable portions of the sheet over a breach in the dam or the levee into which the leak could flow;
    the silicone rubber of the flexible sheet being an inorganic material which maintains consistent flexibility and resilience when subjected to temperatures within a range from negative 100° C. to positive 316° C.;
    at least a portion of the flexible sheet being sufficiently supple to allow the at least a portion of the flexible sheet, when placed over the breach in the dam or levee, to be urged into, and deform about, the breach, under the hydrostatic pressure of the body of water, to seal the breach and preclude a leak of the water from the body of water into the breach;
    the flexible sheet being self-supporting, and free, within the flexible sheet, of any physical support structure independent of the silicone rubber of the flexible sheet: and
    the silicone rubber of the flexible sheet having a density and weight sufficient to allow the flexible sheet to sink, on its own, when placed into the body of water.

2. The apparatus as set forth in claim 1, which further comprises:
    the thickness of the flexible sheet being within a range between 0.015 inch and 0.030 inch.

3. The apparatus as set forth in claim 1, which further comprises:
    the thickness of the flexible sheet being approximately 0.020 inch.

4. A portable and reusable apparatus for covering and stabilizing an existing breach located in an unprotected portion of a dam or a levee to preclude a leak of water, into the breach, from a body of water adjacent the dam or the levee, which comprises:
    a flexible sheet composed of solid, unwoven silicone rubber which is impervious to water, and capable of withstanding hydrostatic water pressure in a body of water without rupturing;
    the silicone rubber of the flexible sheet being an inorganic material which maintains consistent flexibility and resilience when subjected to temperatures within a range from negative 100° C. to positive 316° C.;
    the flexible sheet being self-supporting, and free, within the flexible sheet, of any physical support structure independent of the silicone rubber of the flexible sheet;
    the silicone rubber of the flexible sheet having a density and weight sufficient to allow the flexible sheet to sink, on its own, when placed into the body of water;
    the flexible sheet having a proximal end and a distal end spaced from the proximal end thereof;
    means attached to the proximal end of the flexible sheet for facilitating handling of the flexible sheet; and
    at least a portion of the flexible sheet being sufficiently supple to allow the at least a portion of the flexible sheet, when placed over the breach in the dam or levee, to be urged into, and seal, the breach to preclude a leak of the water from the body of water into the breach.

5. The apparatus as set forth in claim 4, which further comprises:
    the material of the flexible sheet being an elastomer.

6. The apparatus as set forth in claim 4, which further comprises:
    the flexible sheet being composed of an inorganic material which maintains consistent flexibility and structural integrity when subjected to temperatures within a range from negative 100° C. to positive 316° C.

7. The apparatus as set forth in claim 4, which further comprises:
    the thickness of the flexible sheet being within a range between 0.020 inch and 0.030 inch.

8. The apparatus as set forth in claim 4, wherein the means for facilitating handling includes at least one bar attached to the proximal end of the flexible sheet.

9. The apparatus as set forth in claim 4, which further comprises:
    a spool attached to the distal end of the flexible sheet.

10. The apparatus as set forth in claim 4, which further comprises:
    means for maneuvering the flexible sheet from a breach-sealing mode into a storage package in a storage-and-handling mode.

11. The apparatus as set forth in claim 10, wherein the means for maneuvering comprises:
    at least one cord having a proximal end, a distal end, and an intermediate section extending between the proximal end and the distal end thereof;
    a cord moving mechanism attached to the proximal end of the at least one cord adjacent the proximal end of the flexible sheet;
    the intermediate section of the at least one cord extending from the proximal end thereof adjacent an outboard major surface of the flexible sheet, about the distal end of the flexible sheet, and extending from the distal end of the flexible sheet adjacent an inboard major surface of the flexible sheet; and the distal end of the cord being fixedly attached to the means for facilitating handling of the flexible sheet.

12. The apparatus as set forth in claim 11, which further comprises:

means for operating the cord moving mechanism to move the cord in a direction to maneuver the flexible sheet from the breach-sealing mode into the storage package in the storage-and-handling mode.

13. The apparatus as set forth in claim 11, which further comprises:

means for operating the cord moving mechanism to move the cord in a direction to assist in the maneuvering of the flexible sheet from the storage-and-handling mode into the breach-sealing mode.

14. The apparatus as set forth in claim 11, wherein the cord moving mechanism comprises:

at least one bearing attached to the proximal end of the flexible sheet;

a spool mounted within the bearing for movement relative to the bearing;

the proximal end of the cord being attached to the spool; and means for moving the spool to move the cord in a direction to maneuver the flexible sheet from the breach-sealing mode into the storage package in the storage-and-handling mode.

15. The apparatus as set forth in claim 14, which further comprises:

a weight attached to the distal end of the flexible sheet.

16. The apparatus as set forth in claim 15, wherein the weight is a spool.

17. A portable and reusable apparatus for covering and stabilizing an existing breach located in an unprotected portion of a dam or a levee to preclude a leak of water, into the breach, from a body of water adjacent the dam or the levee, which comprises:

a flexible sheet having a proximal end, a distal end and an intermediate section extending between the proximal end and the distal end spaced from the proximal end thereof;

the flexible sheet composed of a material which is impervious to water, and which is sufficiently supple to cover and seal the breach from the body of water;

a rotatable spool coupled to the proximal end of the flexible sheet for rotation relative to the flexible sheet;

at least one cord having a proximal end, a distal end and an intermediate section extending between the proximal end and the distal end thereof;

the proximal end of the cord being attached to the rotatable spool, the distal end of the cord being attached to the proximal end of the flexible sheet, and the intermediate section of the cord extending from the proximal end thereof over an outboard surface of the flexible sheet, about the distal end of the flexible sheet, and over an inboard surface of the flexible sheet, and to the distal end of the cord; and the spool being rotatable relative to the flexible sheet to facilitate movement of the cord in opposite directions during movement of the flexible sheet between a storage-and-handling mode and a breach-sealing mode, and vice-versa.

18. A method of covering and stabilizing an existing breach located in an unprotected portion of a dam or a levee to preclude a leak of water, into the breach, from a body of water adjacent the dam or the levee, which comprises the steps of providing a water-impervious flexible sheet, composed of solid, unwoven silicone rubber, having a proximal end, a distal end and an intermediate section extending between the proximal end and the distal end spaced from the proximal portion thereof;

storing the flexible sheet in the form of a full package when the flexible sheet is in a storage-and-handling mode;

unfurling, from the full package, a proximal portion the flexible sheet extending from the proximal end of the flexible sheet while retaining a remainder of the flexible sheet in a less-than-full package;

placing the less-than-full package of the remainder of the flexible sheet into the body of water; and unfurling at least a portion of the water-bound less-than-full package of the flexible sheet sufficient for a breach-sealing portion of the flexible sheet to cover the breach, whereby the flexible sheet is in a breach-sealing mode.

19. The method as set forth in claim 18, which further comprises the steps of:

positioning a proximal end of a cord adjacent the proximal end of the flexible sheet;

extending an intermediate section of the cord from the proximal end thereof over an outboard surface of the flexible sheet, about the distal end of the flexible sheet, and over an inboard surface of the flexible sheet;

securing the distal end of the cord to a stationary support; and pulling the proximal end of the cord in a direction away from the proximal end and the distal end of the flexible sheet to place the flexible sheet in the form of the full package in the storage-and-handling mode.

20. The method as set forth in claim 19, which further comprises the step of:

attaching the proximal end of the cord to a rotatable spool which, when rotated, will facilitate the winding of the cord onto the spool and thereby placing the flexible sheet in the form of the full package in the storage-and-handling mode.

21. The method as set forth in claim 20, which further comprises the step of:

attaching a storage spool to the distal end of the flexible sheet so that, as the proximal end of the cord is pulled, successive portions of the flexible sheet are located about the storage spool in the form of a roll in the storage-and-handling mode.

* * * * *